METHOD AND APPARATUS FOR PROCESSING A DATA CARD

Filed Aug. 23, 1966

Willy Hess
Inventor

By, Wenderoth Lind & Ponack
Attorneys 3,474,233

METHOD AND APPARATUS FOR PROCESSING A DATA CARD

Willy Hess, Oberrieden, Switzerland, assignor to Oerlikon-Buhrle Holding Ltd., Zurich, Switzerland
Filed Aug. 23, 1966, Ser. No. 574,399
Claims priority, application Switzerland, Aug. 24, 1965, 11,899/65
Int. Cl. G06k 7/00; H01h 43/08
U.S. Cl. 235—61.11 7 Claims

ABSTRACT OF THE DISCLOSURE

An apparatus for processing punched cards comprising a movable carrier for the punched cards for simultaneous reading by reading pins which are arranged displaceably in a movable reading element. Carrier and reading element are connected together through a tension spring and a mutual support means and each one by itself is hinged to a swingable parallelogram control which is limited in its swinging distance by stops. An outside operating force which acts on the carrier, which moves the common tension spring and each loading spring belonging to each reading pin, and moves carrier from a stable starting point over a first unstable dead center point to an intermediate position, where the reading starts and together with the reading element over a second, unstable dead center point into a stable reading position and in the reverse direction of movement back to the starting position.

This invention relates to a method and apparatus for processing a data card from an initial position to a card reading position and then back again to the initial position.

A method of this kind is known in which the carrier for a punched-card as data medium is moved in such a way from the initial to the reading position that an external force operates on the carrier initially in a linear direction and then a second force, basically at right angles to the first, moves the reading element over the carrier into the reading position. An object of the present invention is to overcome the various disadvantages in the above method.

In the known method, a definite sequence is required for the operation of two different forces and a definite time for their engagement or disengagement during the movement, without which precaution, damage to components would result. It is thus not possible to bring the data card to the reading position in one movement which, in any case, would also require considerably more space, due to the diversity of the directions of motion, and this is rendered more difficult if it is to be mounted on the flat front panel of a complete installation. An object of the present invention, therefore, is to eliminate the above disadvantages by providing a movement and construction which is extremely simple and efficient.

A further object is to provide a construction whereby the carrier for a data card may be moved with an externally applied force against the tension of a spring from the initial position via a dead center, and then allowing the spring to take it to an intermediate position in which the carrier engages with the reading element and the spring keeps carrier and reading element together up to the reading position. External force is again applied to the carrier and moves it and the reading element together against a force exerted by the reading element on the carrier via a second dead center into the final position at the end of the movement. In order to return the mechanism to the initial position, the external force is applied to the carrier in the opposite direction.

A still further object of the invention is to provide a construction wherein there is provided a double parallelogram motion brought about by the movement of pairs of swinging arms having a different length which are hinged from a common base to the carrier and the reading element which in turn are interconnected by a spring.

A still further object of the invention is to provide a construction wherein the carrier presses against three stops in succession, of which the first determines the initial position of the carrier with the swinging arms in the folded position, the second stop is situated on the reading element so that the latter and the carriage engage in the intermediate position, and the third stop fixes the reading position. A fourth, fixed, stop holds the reading element during its separation from the carrier.

With the above and other objects in view which will become apparent from the detailed description below, a preferred embodiment of the invention is shown in the drawings, in which.

Figures 1, 2, 3:
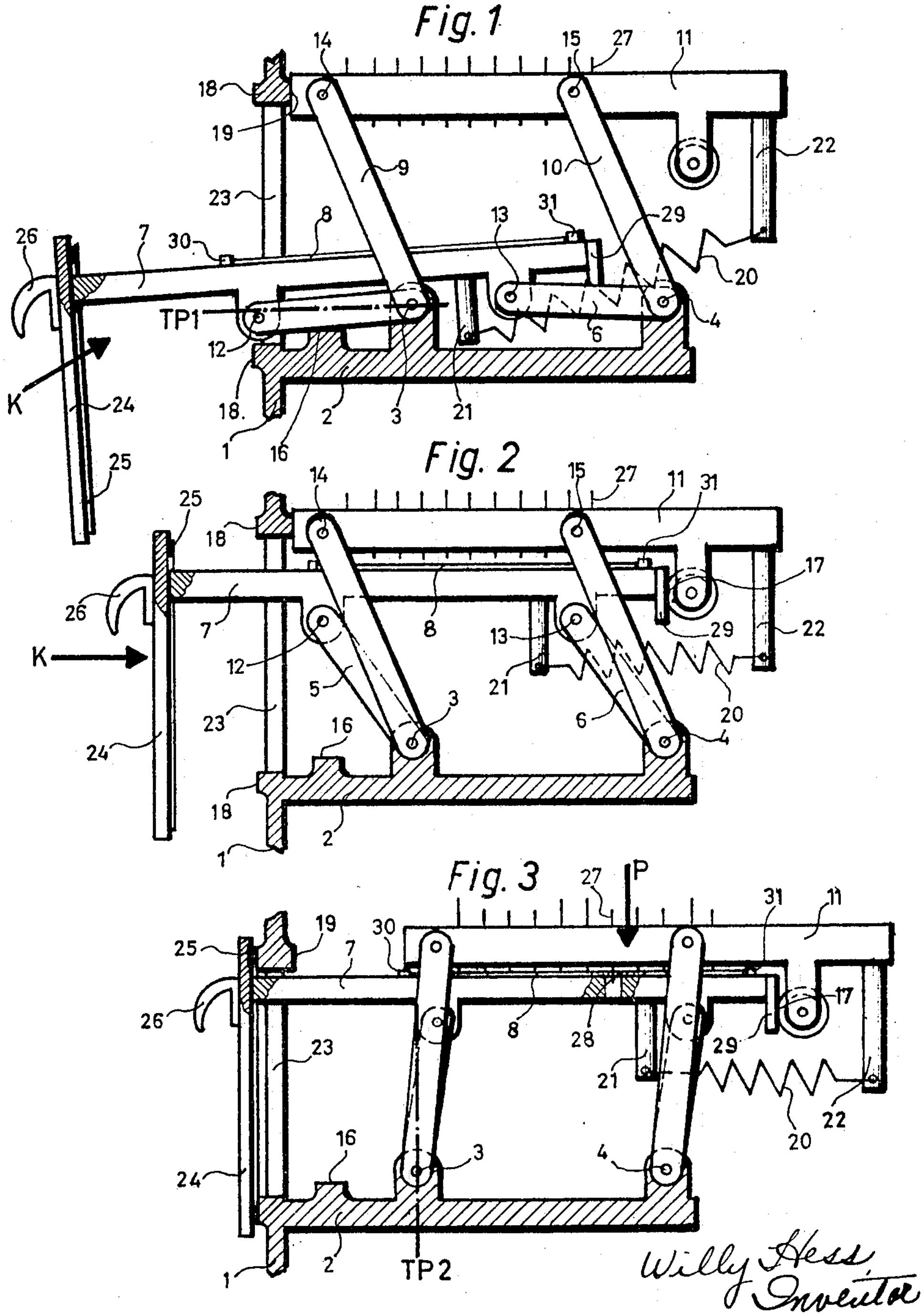
FIGURE 1 is a partial cross-sectional view with parts shown in elevation illustrating the initial positon of the parts in which a data card may be inserted or removed.
FIGURE 2 is a similar view to that shown in FIGURE 1 illustrating the intermediate position of the parts.
FIGURE 3 is a similar view showing the parts in the reading position.

On the front panel 1, for example, of a control unit, a base plate 2 is fixed at right angles to panel 1, as shown on FIGURE 1, on which two hinge points 3, 4 are situated, separated by a length of the base-plate. Short swinging arms 5 and 6 are hinged to each of the pivot points 3, 4 and attached to the flat carrier 7 for the data-card 8 which may be, for example, a punched card held between the alignment strips 30 and 31. Longer swinging arms, 9 and 10, from the same pivot points are fixed to a flat reading element 11. The distances between the hinge points of the swinging arms on the carrier 7, on the reading element 11 and on baseplate 2 between pivot points 3 and 4 are all equal. The hinge points are so arranged that a parallelogram motion on pivot points 3, 4, 12 and 13 occurs for the carrier 7 and similarly via points 3, 4, 14 and 15 for the reading element 11.

The range of swing for the two movements is, however, limited by stops 16 and 18 for the carrier 7 and by 19 and 17 for the reading element 11. The first stop 16 fixes the initial position of carrier 7 in which the arms 5 and 6 are brought into a folded position. In the initial position (FIGURE 1) the carrier 7 is in an easily accessible position for insertion or removal of the punched card 8.

A second stop 17 determines an intermediate position where the carrier 7 makes contact with the reading element 11 (FIGURE 2) and a third stop 18 fixes the reading position (FIGURE 3) in which the carrier 7 and reading element 11 together reach the limit of their common motion. The latter component has a second limit in a fourth stop 19 on the front panel 1 where it rests when carrier 7 and reading element 11 are separated.

The carrier 7 and the reading element 11 are interconnected by a tension spring 20. This is fixed to the carrier 7 at the lower end of a stud 21 fitted perpendicularly to the carrier and secured in a similar way at the lower end of a stud 22 on reading element 11.

The front panel 1 has a large opening 23 which can be locked by a coverplate 24 fixed to the carrier 7 and sealed against dust and other outside influences by the seal 25. It is placed so that closure is against stops 18 (FIGURE 3). A handle 26 fixed to the cover plate 24 is used for manual operation or as the point of application for the external force K for moving the carrier 7.

The reading element 11 is known. Only reading pins 27 are shown on the drawing which engage during reading in the perforations 28 of the punched card 8. Otherwise the pins 27 exercise an overall pressure P on the carrier 7 during reading by means of their small tensioning springs, not shown on the drawing.

By means of a roller surface 29 on carrier 7 positioned in the reading direction of the reading pins 27, and by designing of stop 17 as a ball-bearing, carrier 7 and reading element 11 can be moved in relation to one another in the direction of reading.

The closest contact, and hence the greatest pressure P, results when the swinging arms 5, 6, 9, 10 of both parallelograms lie together. By suitable arrangement of the common base with the pivot points 3, 4, a state of unstable equilibrium occurs under the influence of the pressure P, which is hereinafter called the dead center TP2. The range of swing of the two parallelograms 3, 4, 12, 13 and 3, 4, 14, 15, is limited so that they are able to pass the dead center TP2 by a small amount to the right as shown on the drawing and reach the stable reading position (FIGURE 3).

A similar unstable dead center TP1 is provided for swinging arm 5 under the influence of tension spring 20 whereby a small anti-clockwise rotation of the arm 5 achieves the stable initial position (FIGURE 1) of carrier 7.

From the above description, the method of moving the data card 8 from the initial position of FIGURE 1 to the reading position of FIGURE 3 takes place in the following way:

The punched card 8 is inserted on the carrier 7 between the alignment strips 30, 31 in the initial position. Then manual force K is applied to the handle 26 to pull the parallelograms 3, 4, 12, 13 out of its folded position and to overcome the dead center TP1. Then spring 20 translates it as far as stop 17 until the roller surface 29 rests under pressure on the ball-bearing in the intermediate position (FIGURE 2). No further relative motion of carrier 7 and reading element 11 takes place in the plane of the carrier, so that possible damage to reading pins 27 is avoided. In order that reading may commence force K has to be re-applied to the handle 26 to overcome the pressure P produced by the reading pins 27 on the unpunched parts of the card 8 until the second dead center TP2 is passed and both parallelograms 3, 4, 12, 13 and 3, 4, 14, 15 snap into the pre-arranged reading position automatically (FIGURE 3).

In the reverse direction, force K must be applied in the other sense to handle 26 to overcome the dead center TP2 by lifting reading pins 27. From this dead center until pins 27 lift from the punched card 8, pressure P supports the external force K, but the spring 20 must then be tensioned until dead center TP1 is passed.

The spring then exerts a torque due to its practically transverse tensioning force relative to the studs 21 and 22 and causes the mechanism to snap into the initial position (FIGURE 1) which concludes the cycle of operations and the punched card 8 can be removed.

It is quite possible, without changing any part of the process, to employ a remote operated motor, for example, instead of manual operation.

The method and structure according to the present invention can also be effected in other ways. For example, it is possible to replace the swinging arms with circular segment guides fixed in two planes parallel to the motion. Pins are required on the carrier and reading element at the fulcrums and these engage with the corresponding guides.

I claim:

1. An apparatus for processing punched cards comprising a fixed base having spaced pivot points located on a base line connecting said points, a flat carrier holding said punched cards during their processing movable relative to said base, a platelike reading element for reading of said punched cards movable relative to said base comprising reading pins arranged in lines and columns at a right angle to said base line and longitudinally displaceable, each one of said reading pins having a loading spring urging its associated pin in the direction of said base line to a displaced position relative to said reading element, a first pair of equal arms pivotally mounted at said pivot points and to said carrier thereby forming a first, interconnecting parallelogram, a second pair of equal arms longer than the arms of said first pair pivotally mounted on said pivot points and on said reading element thereby forming a second parallelogram, tensioning means connecting said carrier with said reading element, a first stop on said base located below said base line to limit the pivotal movement of said carrier cooperating with one said arms of said first pair for holding said carrier under the influence of said tensioning means in a stable initial position outside of a first, unstable dead center position located on said base line of said first parallelogram, a second stop on said base cooperating with said reading element under the influence of said tensioning means, support means on said carrier and said reading element for common, mutual support of the pivoting distance between an intermediate position and a reading position of both said parallelograms, whereby a second line situated in a right angle to said base line and going through one of said pivot points defines a second common, unstable dead center position of both said parallelograms and said intermediate position is located on the side turned to said first dead center position wherein a punched card lying on said carrier touches said reading pins which are on said displaced position of said supported reading element at said second stop and whereby in said reading position said two parallelograms are together on the other side of said second dead center position, and a third stop on said base cooperating with said carrier limiting the pivoting of both said parallelograms in said reading position.

2. An apparatus according to claim 1, wherein said tensioning means is a tension spring exerting a torque on said carrier to produce the interconnecting of said first parallelogram.

3. An apparatus according to claim 1, wherein said common support means of said carrier and said reading element comprises a roller surface aligned parallel to the displacement direction of said reading pins arranged on one of the sides of said parallelograms a roller bearing on the other of the sides within the pivoting distance of said both parallelograms between said intermediate position and the reading position rolling on said roller surface whereby a relative movement of said carrier and said reading element under the action of loading springs of said reading pins when opposite an unpunched place of said punched card allow only an approach to the displacement direction of said reading pins.

4. An apparatus according to claim 1 wherein the starting position is closely adjacent to said first dead center and said reading position is slightly past said second dead center point.

5. An apparatus according to claim 1, wherein said base comprises a base plate provided with both said pivot points, said first stop and a front panel set at a right angle to said base plate, said front panel comprising a window into which in said starting position said carrier protrudes partially to facilitate the insertion and removal of one of said punched cards, a front side where said third stop is arranged as a framing of said window, and a back side where said base plate and said second stop are arranged.

6. An apparatus according to claim 5, provided with a cover plate set at a right angle to said carrier, said cover plate comprising a seal, which in said reading position seals said window against said third stop and a handle for moving said parallelograms beyond said dead center positions.

7. An apparatus according to claim 1 wherein means are provided for the congruent control of said carrier and said reading element.

References Cited

UNITED STATES PATENTS

| | | | |
|---|---|---|---|
| 1,411,788 | 4/1922 | Kellogg | 101—292 |
| 2,025,022 | 12/1935 | Sussman | 101—301 X |
| 2,057,805 | 10/1936 | Valiquette | 101—301 X |
| 2,797,639 | 7/1957 | Hitch | 101—301 X |
| 3,066,863 | 12/1962 | Wilson | 200—46 X |
| 3,152,247 | 10/1964 | Brown | 200—46 X |
| 3,182,992 | 5/1965 | Braun | 235—61.11 X |
| 3,267,260 | 8/1966 | Baker et al. | 200—46 X |

DARYL W. COOK, Primary Examiner

ROBERT M. KILGORE, Assistant Examiner

U.S. Cl. X.R.

100—286; 200—46